United States Patent
Horii et al.

(10) Patent No.: US 11,180,143 B2
(45) Date of Patent: Nov. 23, 2021

(54) VEHICLE CONTROL DEVICE

(71) Applicant: HONDA MOTOR CO., LTD., Tokyo (JP)

(72) Inventors: Hiroaki Horii, Wako (JP); Tadahiko Kanou, Wako (JP); Takashi Kuboshima, Wako (JP); Ken Hanayama, Wako (JP); Jun Ochida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 206 days.

(21) Appl. No.: 16/467,261

(22) PCT Filed: Dec. 7, 2016

(86) PCT No.: PCT/JP2016/086392
§ 371 (c)(1),
(2) Date: Jun. 6, 2019

(87) PCT Pub. No.: WO2018/105058
PCT Pub. Date: Jun. 14, 2018

(65) Prior Publication Data
US 2019/0299991 A1    Oct. 3, 2019

(51) Int. Cl.
*B60W 30/165* (2020.01)
*G05D 1/02* (2020.01)
(Continued)

(52) U.S. Cl.
CPC ......... *B60W 30/165* (2013.01); *G05D 1/0295* (2013.01); *G08G 1/09* (2013.01);
(Continued)

(58) Field of Classification Search
CPC . B60R 2300/806; B60W 10/20; B60W 30/06; B60W 30/165; B62D 15/028; G05D 1/0295
See application file for complete search history.

(56) References Cited

U.S. PATENT DOCUMENTS

2013/0024075 A1* 1/2013 Zagorski ............ B60T 7/22
701/46
2013/0063599 A1* 3/2013 Imai ............ G06K 9/00798
348/148
(Continued)

FOREIGN PATENT DOCUMENTS

CN   105788367 A    7/2016
JP   H05-307696 A   11/1993
(Continued)

OTHER PUBLICATIONS

PCT/ISA/210 from International Application PCT/JP2016/086392 and the English translation thereof.
(Continued)

*Primary Examiner* — Redhwan K Mawari
*Assistant Examiner* — Toya Pettiegrew
(74) *Attorney, Agent, or Firm* — Carrier Blackman & Associates, P.C.; Joseph P. Carrier; Jeffrey T. Gedeon

(57) ABSTRACT

A surroundings recognition unit recognizes the road environment and traffic participants around the host vehicle. A condition satisfaction determination unit determines whether or not first to fifth conditions are satisfied, on the basis of recognition results from the surroundings recognition unit. When causing the host vehicle to travel in a lane of a traveling road adjacent to the edge of the traveling road, a control unit changes travel control content and/or notification control content relating to automated driving, depending on whether or not the first to fifth conditions are satisfied.

4 Claims, 7 Drawing Sheets

(51) Int. Cl.
    *G08G 1/09*     (2006.01)
    *B60W 10/04*     (2006.01)
    *B60W 10/18*     (2012.01)
    *B60W 10/20*     (2006.01)

(52) U.S. Cl.
    CPC ............ *B60W 10/04* (2013.01); *B60W 10/18* (2013.01); *B60W 10/20* (2013.01); *B60W 2420/42* (2013.01); *B60W 2420/52* (2013.01); *G05D 1/0236* (2013.01); *G05D 1/0246* (2013.01)

(56) References Cited

U.S. PATENT DOCUMENTS

2015/0153735 A1*  6/2015  Clarke ..................... B60R 1/00
                                                      701/301

2018/0118223 A1    5/2018  Mori et al.
2018/0173231 A1*  6/2018  Takae .................. B60W 30/143
2019/0092325 A1*  3/2019  Oka ......................... G08G 1/16

FOREIGN PATENT DOCUMENTS

| | | |
|---|---|---|
| JP | 2005-234791 A | 9/2005 |
| JP | 2007-241898 A | 9/2007 |
| JP | 2014-056484 A | 3/2014 |
| JP | 2016-197390 A | 11/2016 |
| WO | 2016/002276 A1 | 1/2016 |

OTHER PUBLICATIONS

Office Action and Search Report dated Feb. 3, 2021 issued over the corresponding Chinese Patent Application No. 201680091449.0 with the English translation thereof.

* cited by examiner

VEHICLE CONTROL DEVICE

TECHNICAL FIELD

The present invention relates to a vehicle control device that performs travel control of a host vehicle at least partially automatically by automated driving.

BACKGROUND ART

Japanese Laid-Open Patent Publication No. 2007-241898, Japanese Laid-Open Patent Publication No. 05-307696, and Japanese Laid-Open Patent Publication No. 2005-234791 each disclose a device that detects a vehicle that stops at a road side (for example, outside travel path or at road shoulder).

SUMMARY OF INVENTION

Another vehicle, which has stopped at a road side, may suddenly start to travel and enter a lane. If a driver drives a host vehicle, the driver controls the host vehicle in advance in preparation for such a sudden travel start of the other vehicle and therefore can avoid the contact with the other vehicle. On the other hand, in a case of what is called an automated driving vehicle, in which a vehicle control device drives the host vehicle, the contact with the other vehicle is avoided in such a way that the vehicle control device controls the host vehicle at the time of detection of the sudden travel start of the other vehicle. In this case, large braking force or steering quantity is generated in the host vehicle, thus resulting in deterioration of riding comfort of the driver.

The present invention has been made in view of such a problem, and an object is to provide a vehicle control device that can avoid deterioration of riding comfort.

A vehicle control device provided for a host vehicle that can travel by automated driving includes: an external environment recognition unit configured to recognize a road environment and a traffic participant around the host vehicle; a control unit configured to control travel and/or control notification regarding the automated driving of the host vehicle; and a condition determination unit configured to determine whether a predetermined condition is satisfied on a basis of a recognition result from the external environment recognition unit, wherein the predetermined condition includes at least one of the following: a width of a lane where the host vehicle travels is less than a first threshold, a width of a road shoulder of a road where the host vehicle travels is less than a second threshold, the road includes a turnout area ahead of the host vehicle, number of lanes in the road decreases ahead of the host vehicle, and another vehicle exists in a manner that the other vehicle travels beside the host vehicle at a position with less than a predetermined distance from the host vehicle and at less than a predetermined relative speed with respect to the host vehicle, and wherein if the host vehicle travels in the lane adjacent to an area outside a travel path, the control unit is configured to change a content of the control depending on whether the predetermined condition is satisfied.

By the above configuration, if the host vehicle travels in the lane adjacent to the area outside the travel path and the predetermined condition is satisfied, the host vehicle can avoid the other vehicle, which stops outside the travel path or travels in a merge lane, in advance in preparation for the coming of the other vehicle in front of the host vehicle. Therefore, the host vehicle does not generate the large braking force or steering quantity when the other vehicle comes, and accordingly, the riding comfort of the vehicle occupant does not deteriorate.

The control may include at least one of: vehicle speed control for controlling vehicle speed of the host vehicle; inter-vehicle distance control for controlling an inter-vehicle distance between the host vehicle and a preceding vehicle; travel position control for deviating a center of the host vehicle from a center of the lane by causing the host vehicle to move to a side opposite to a side of the road shoulder; lane changing control for causing the host vehicle to change a lane to the side opposite to the side of the road shoulder; warning control for warning a vehicle occupant; and manual driving request control for prompting the vehicle occupant to drive manually. By the above configuration, the control to avoid the other vehicle is performed in advance; therefore, the riding comfort of the vehicle occupant does not deteriorate.

The condition determination unit may be configured to set a criterion of the predetermined condition in accordance with at least one of a type of the traffic participant, a quantity of the traffic participant, and vehicle speed of the host vehicle. By the above configuration, whether the predetermined condition is satisfied can be determined with higher accuracy.

If at least one of the vehicle speed control, the inter-vehicle distance control, the travel position control, and the lane changing control is performed, the control unit may be configured to perform notification control to notify the vehicle occupant of a reason why the control is performed. By the above configuration, the vehicle occupant does not feel uncomfortable in the operation of the host vehicle.

DESCRIPTION OF EMBODIMENTS

A preferred embodiment of a vehicle control device according to the present invention is hereinafter described with reference to the attached drawings.

1. CONFIGURATION OF VEHICLE CONTROL SYSTEM 10

A vehicle control device 20 according to the present invention constitutes a part of a vehicle control system 10 to be mounted in a vehicle. In addition to the vehicle control system 10, the vehicle control device 20 is also described below.

[1.1 Overall Configuration]

Figure 1:
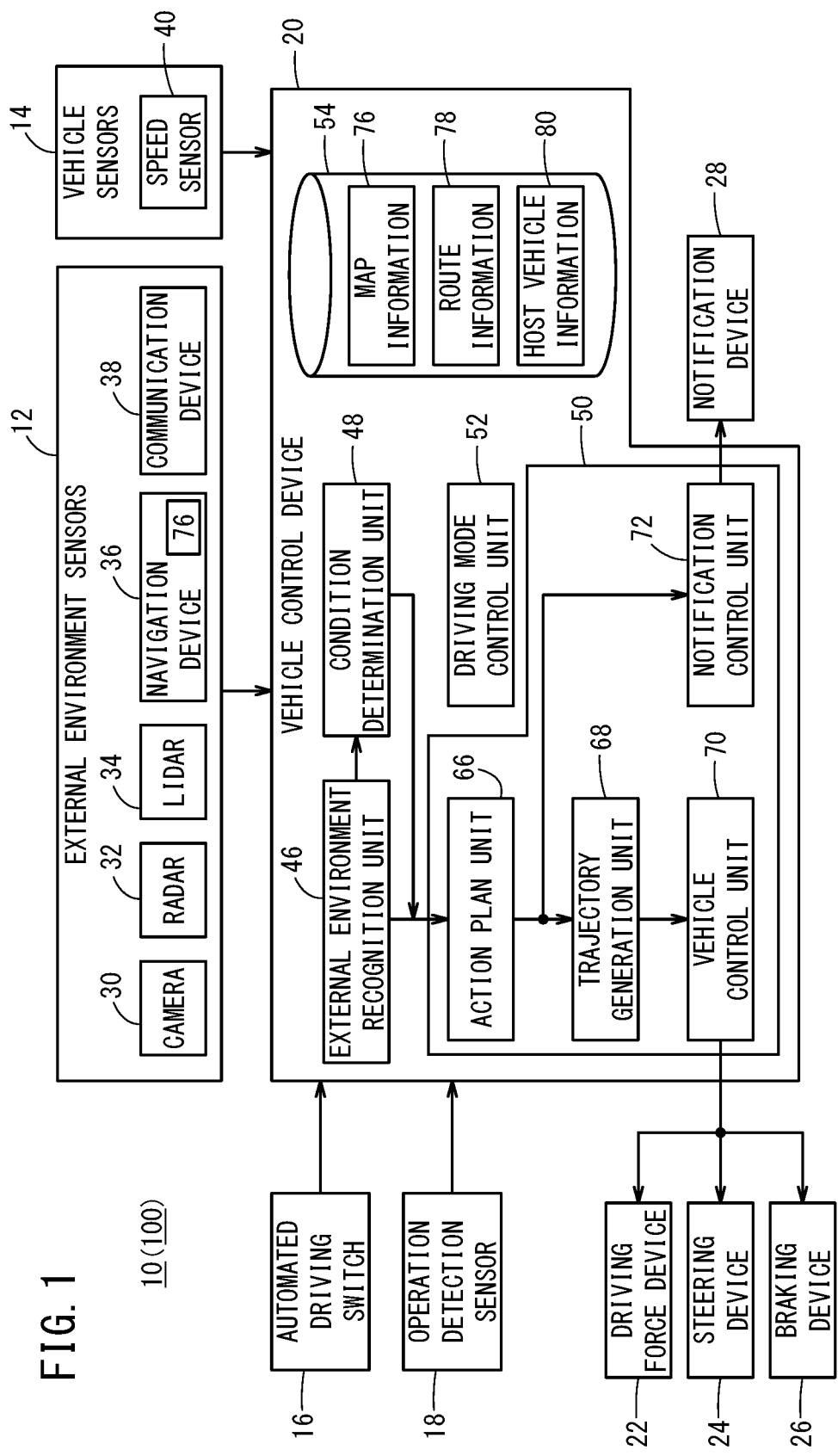
FIG. 1 is a block diagram illustrating a configuration of a vehicle control system including a vehicle control device according to the present invention.

The vehicle control system 10 is described with reference to FIG. 1. The vehicle control system 10 is incorporated in a host vehicle 100 and performs travel control of the host vehicle 100 through automated driving or manual driving. This "automated driving" refers to a concept including not just "fully automated driving" in which the travel control of the host vehicle 100 is fully automated but also "partial automated driving" or "driving assistance" in which the travel control is partially automated.

The vehicle control system 10 basically includes an input system device group, the vehicle control device 20, and an output system device group. Devices in the input system device group and the output system device group are connected to the vehicle control device 20 through communication lines.

The input system device group includes external environment sensors 12, vehicle sensors 14, an automated driving switch 16, and an operation detection sensor 18. The output system device group includes a driving force device 22 that drives wheels (not shown), a steering device 24 that steers the wheels, a braking device 26 that brakes the wheels, and a notification device 28 that notifies a driver visually, audibly, or tactilely.

[1.2 Specific Configuration of Input System Device Group]

The external environment sensors 12 acquire information expressing an external environment state of the host vehicle 100 (hereinafter, external environment information), and outputs the external environment information to the vehicle control device 20. The external environment sensors 12 specifically include one or more cameras 30, one or more radars 32, one or more LIDARs 34 (Light Detection and Ranging, Laser Imaging Detection and Ranging), a navigation device 36, and a communication device 38.

The navigation device 36 includes a positioning device that measures the position of the host vehicle 100 using a satellite or the like, a storage device that stores map information 76, and a user interface (for example, a touch panel display, a speaker, and a microphone). The navigation device 36 generates a travel route from the position of the host vehicle 100 to a destination designated by a user by using the positioning device and the map information 76. The positional information of the host vehicle 100 and the information about the travel route are output to the vehicle control device 20.

The communication device 38 is configured to be able to communicate with an external device including a road side machine, another vehicle, and a server. For example, the communication device 38 transmits and receives the information regarding traffic equipment (for example, a traffic signal), the information regarding other vehicles, the probe information, or the latest map information 76. These pieces of information are output to the vehicle control device 20.

The vehicle sensors 14 include a speed sensor 40 that detects a vehicle speed (speed of vehicle) V. The vehicle sensors 14 include other sensors that are not shown, such as an acceleration sensor that detects acceleration, a lateral acceleration sensor that detects lateral acceleration, a yaw rate sensor that detects an angular speed around a vertical axis, an azimuth sensor that detects a direction/azimuth, and an inclination sensor that detects inclination. The signals detected in these sensors are output to the vehicle control device 20.

The automated driving switch 16 is a switch that is provided to, for example, a steering wheel, an instrument panel, or the like. The automated driving switch 16 is configured to be able to change a plurality of driving modes through a manual operation of the user including the driver. The automated driving switch 16 outputs a mode change signal to the vehicle control device 20.

The operation detection sensor 18 detects, for example, whether a driver's operation is performed, the operation amount, or an operation position for various kinds of operation devices that are not shown. The operation detection sensor 18 includes an accelerator pedal sensor that detects the operation amount of an accelerator pedal or the like, a brake pedal sensor that detects the operation amount of a brake pedal or the like, a torque sensor that detects steering torque input from the steering wheel, and a direction indicator sensor that detects an operation direction of a direction indicator switch. The signals detected in the respective sensors are output to the vehicle control device 20.

[1.3 Specific Configuration of Output System Device Group]

The driving force device 22 includes a driving force ECU (Electronic Control Unit) and a driving source including an engine/traction motor. The driving force device 22 generates travel driving force (torque) of the host vehicle 100 in accordance with a vehicle control value that is output from the vehicle control device 20, and transmits the travel driving force to the wheels directly or through a transmission.

The steering device 24 includes an EPS (electric power steering system) ECU and an EPS actuator. The steering device 24 changes the direction of the wheels (steering wheels) in accordance with the vehicle control value that is output from the vehicle control device 20.

The braking device 26 is, for example, an electric servo brake that is used in combination with a hydraulic brake, and includes a brake ECU and a brake actuator. The braking device 26 brakes the wheels in accordance with the vehicle control value that is output from the vehicle control device 20.

The notification device 28 includes a notification ECU, a display device, an audio device, and a haptic device. The notification device 28 performs a notification operation regarding the automated driving or the manual driving in accordance with a notification instruction that is output from the vehicle control device 20. In the notification operation, the notification ECU controls one or a plurality of devices among the display device, the audio device, and the haptic device. Here, the notification ECU may change the device to operate or the operation itself depending on what to notify.

[1.4 Driving Mode]

The vehicle control device 20 is set so as to change the driving mode between "automated driving mode" and "manual driving mode" (non-automated driving mode) in accordance with the operation of the automated driving switch 16. The automated driving mode is the driving mode in which the driver does not operate the operation device (specifically, an accelerator pedal, a steering wheel, or a brake pedal) and the host vehicle 100 travels under the control of the vehicle control device 20. In other words, the automated driving mode is the driving mode in which the vehicle control device 20 controls the driving force device 22, the steering device 24, and the braking device 26 entirely or partially in accordance with an action plan that is successively created. Note that when the driver performs a predetermined operation with the operation device during the execution of the automated driving mode, the automated driving mode is automatically canceled and the driving mode is changed to the driving mode with a relatively low automated driving level (including the manual driving mode).

[1.5 Configuration of Vehicle Control Device 20]

The vehicle control device 20 includes one or a plurality of ECUs, and includes a storage device 54 and various function achievement units. The function achievement unit is a software function unit that achieves a function when a CPU (central processing unit) executes programs stored in the storage device 54. The function achievement unit may be a hardware function unit including an integrated circuit such as an FPGA (Field-Programmable Gate Array). The function achievement unit includes an external environment recognition unit 46, a condition determination unit 48, a control unit 50, and a driving mode control unit 52.

The external environment recognition unit 46 recognizes static external environment information around the host vehicle 100 by using the external environment information acquired by the external environment sensors 12, the map information 76 stored in the storage device 54, and the like, and generates external environment recognition information. The static external environment information includes, for example, a recognition object such as a lane mark, a stop line, a traffic signal, a traffic sign, a ground object (real estate), a travel possible area, or a turnout area. In addition, the static external environment information includes positional information of each recognition object. The external environment recognition unit 46 recognizes dynamic external environment information around the host vehicle 100 by using the external environment information acquired by the external environment sensors 12, and generates external environment recognition information. The dynamic external environment information includes, for example, an obstacle such as a parked or stopped vehicle, a traffic participant such as a pedestrian or another vehicle (including a bicycle), a traffic signal (light color of a traffic signal), and the like. The dynamic external environment information also includes information about an operation direction of each recognition object.

On the basis of a recognition result from the external environment recognition unit 46, the condition determination unit 48 determines whether a predetermined condition is satisfied. The predetermined condition is a determination condition to determine a situation in which another vehicle 102A (see FIG. 4 to FIG. 6), which has stopped, suddenly starts to travel and enters a travel lane 112 (see FIG. 4 to FIG. 6) where the host vehicle 100 travels, or a determination condition to determine a situation in which it is difficult for the host vehicle 100 to avoid the other vehicle 102A that enters the travel lane 112 where the host vehicle 100 travels. Specifically, for example, the following first to fifth conditions are set: a first condition in which a width W1 of the travel lane 112 where the host vehicle 100 travels is less than a first threshold Wth1 (see FIG. 4); a second condition in which a width W2 of a road shoulder 114 of a road 110 where the host vehicle 100 travels is less than a second threshold (Wth2) (see FIG. 4); a third condition in which the road 110 includes a turnout area 124 ahead of the host vehicle 100 (see FIG. 5); a fourth condition in which the number of lanes in the road 110 decreases ahead of the host vehicle 100 (see FIG. 6); and a fifth condition in which another vehicle 102S exists such that the other vehicle 102S travels beside (travels side by side or in parallel with) the host vehicle 100 at a position with less than a predetermined distance from the host vehicle 100 and at less than a predetermined relative speed with respect to the host vehicle 100.

The condition determination unit 48 determines whether the first to fifth conditions are satisfied depending on whether criteria are satisfied (for example, more than or equal to a threshold or less than the threshold). The criteria include, for example, the first threshold Wth1, the second threshold Wth2, the distance from the host vehicle 100 to the turnout area 124, the distance from the host vehicle 100 to the place where the number of lanes decreases, the relative speed between the host vehicle 100 and the other vehicle 102S that travels beside the host vehicle 100, and the like. The criteria may be either constant or changed in accordance with parameters including the type of the traffic participant, the quantity of traffic participants, the vehicle speed V, and the like. The first to fifth conditions are stored in the storage device 54. Specific examples of the first to fifth conditions are described in the paragraph [2.2] below.

The control unit 50 performs the travel control and notification control of the host vehicle 100 on the basis of the recognition result from the external environment recognition unit 46 and a determination result from the condition determination unit 48. In a case where the host vehicle 100 travels in the travel lane 112 (see FIG. 4, etc.) adjacent to an area outside the travel path (for example, the road shoulder 114 in FIG. 4, etc. or a median strip that is not shown), the control unit 50 changes the content of the control depending on whether the first to fifth conditions are satisfied. The control unit 50 functions as an action plan unit 66, a trajectory generation unit 68, a vehicle control unit 70, and a notification control unit 72.

The action plan unit 66 creates an action plan (events in time series) for each travel section on the basis of the recognition result from the external environment recognition unit 46 and the determination result from the condition determination unit 48, and updates the action plan as necessary. Examples of the kind of events include decelerating, accelerating, branching, merging, lane keeping, lane changing, and overtaking. Here, "decelerating" and "accelerating" are the events of decelerating and accelerating the host vehicle 100, respectively. "Branching" and "merging" are the events of making the host vehicle 100 smoothly travel at a branch point and a merge point, respectively. "Lane changing" is the event of making the host vehicle 100 change the lane. "Overtaking" is the event of making the host vehicle 100 overtake the other vehicle ahead of the host vehicle 100. "Lane keeping" is the event of making the host vehicle 100 travel so as not to deviate from the lane, and is segmented depending on the combination with a travel mode. Specific examples of the travel mode include a constant-speed travel, a following travel, a decelerated travel, a curve travel, and an obstacle avoiding travel.

The trajectory generation unit 68 generates a scheduled travel trajectory that follows the action plan created by the action plan unit 66 by using the map information 76, route information 78, and host vehicle information 80 read out from the storage device 54. This scheduled travel trajectory is data expressing target behavior in time series, and is specifically a time-series data set whose data units are a position, a posture angle, speed, acceleration and deceleration, a curvature, a yaw rate, a steering angle, and lateral acceleration.

The vehicle control unit 70 decides various vehicle control values for controlling the travel of the host vehicle 100 in accordance with the scheduled travel trajectory generated by the trajectory generation unit 68. The vehicle control unit 70 outputs the decided vehicle control values to the driving force device 22, the steering device 24, and the braking device 26.

If the driving mode control unit 52 performs a shift process from the automated driving mode to the manual driving mode or the notification instruction is received from the driving mode control unit 52, the notification control unit 72 outputs the notification instruction to the notification device 28.

The driving mode control unit 52 performs the shift process from the manual driving mode to the automated driving mode or the shirt process from the automated driving mode to the manual driving mode in accordance with a signal output from the automated driving switch 16. The driving mode control unit 52 also performs the shift process from the automated driving mode to the manual driving mode in accordance with a signal output from the operation detection sensor 18. The driving mode control unit 52 sends the notification instruction to the notification control unit 72 in order to, for example, request the driver to drive manually or warn the driver.

The storage device 54 stores the map information 76, the route information 78, and the host vehicle information 80. The map information 76 is the information output from the navigation device 36 or the communication device 38. The route information 78 is the information about a scheduled travel route output from the navigation device 36. The host vehicle information 80 is a detection value output from the vehicle sensors 14. The storage device 54 also stores various numerals that are used in the vehicle control device 20.

2. PROCESS TO BE PERFORMED BY VEHICLE CONTROL DEVICE 20

[2.1 Main Process]

A main process to be performed by the vehicle control device 20 is described with reference to FIG. 2. The process to be described below is performed periodically. In step S1, whether the automated driving is performed currently is determined. If the automated driving is performed currently (step S1: YES), the process advances to step S2. On the other hand, if the automated driving is not performed currently (step S1: NO), the process is terminated once. In step S2, various pieces of information are acquired. The vehicle control device 20 acquires the external environment information from the external environment sensors 12, and acquires various signals from the vehicle sensors 14.

In step S3, the condition determination unit 48 performs a condition determination process on the basis of the recognition result from the external environment recognition unit 46. The condition determination process is described in the paragraph [2.2] below.

In step S4, whether any one of flags is 1 is determined. The flag herein described refers to each flag set in the condition determination process in step S3 (a lane width flag, a road shoulder width flag, a turnout area flag, a lane number flag, or a parallel traveling vehicle flag). If any one of the flags is 1 (step S4: YES), the process advances to step S5. If none of the flags is 1 (step S4: NO), the process advances to step S6.

If the process has advanced from step S4 to step S5, the control unit 50 performs a control changing process on the basis of the recognition result from the external environment recognition unit 46. The control changing process is described in the paragraph [2.3] below. If the process has advanced from step S4 to step S6, the control unit 50 maintains the normal control on the basis of the recognition result from the external environment recognition unit 46.

[2.2 Condition Determination Process]

Figure 2:
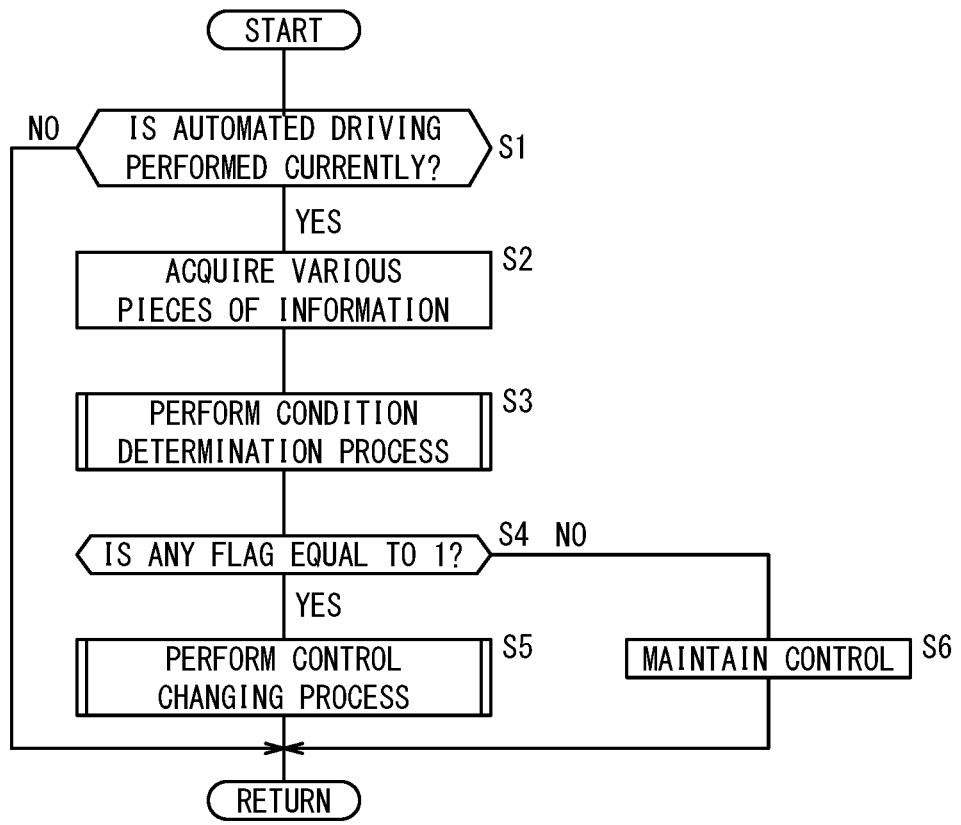
FIG. 2 is a flowchart of a process to be performed by the vehicle control device according to one embodiment.

The condition determination process to be performed in step S3 in FIG. 2 is described with reference to FIG. 3. Each process below is performed mainly by the condition determination unit 48. In the whole process shown in FIG. 3, step S13 and step S14 form a pair, step S15 and step S16 form a pair, step S17 and step S18 form a pair, step S19 and step S20 form a pair, and step S21 and step S22 form a pair. The order of processes of the five pairs in FIG. 3 may be exchanged or the processes by the pairs may be performed at the same time.

In step S11, the condition determination unit 48 initializes each flag (the lane width flag, the road shoulder width flag, the turnout area flag, the lane number flag, or the parallel traveling vehicle flag).

In step S12, the condition determination unit 48 sets the criteria in the first to fifth conditions that are used in the processes in step S13, step S15, step S17, step S19, and step S21. Here, the condition determination unit 48 sets each criterion in accordance with at least one parameter among the type of the traffic participant, the quantity of the traffic participants, and the vehicle speed V. The type of the traffic participant and the quantity of the traffic participants can be determined on the basis of the recognition result from the external environment recognition unit 46. The storage device 54 stores a map (table) in which the parameters and the criteria are correlated with each other, and the condition determination unit 48 sets the criteria by using this map. For example, the condition determination unit 48 sets the criteria so that the condition is satisfied more easily when the traffic participant ahead of the host vehicle 100 is a large automobile, a standard automobile, and a bicycle in this order. Alternatively, the condition determination unit 48 sets the criteria so that the condition is satisfied more easily as more traffic participants exist within a predetermined distance from the host vehicle 100. Further alternatively, the condition determination unit 48 sets the criteria so that the condition is satisfied more easily as the vehicle speed V is higher.

Note that the criteria may be constant instead of being changed in accordance with the parameter. For example, the first threshold Wth1 corresponding to the criterion of the first condition may be a predetermined multiple of (for example, twice) the vehicle width of the host vehicle 100. In addition, the second threshold Wth2 corresponding to the criterion of the second condition may be a predetermined multiple of (for example, once) the vehicle width of the host vehicle 100. Moreover, the distance from the host vehicle 100 to the turnout area 124, which corresponds to the criterion of the third condition, may be about 300 m. Additionally, the distance from the host vehicle 100 to the place where the number of lanes decreases, which corresponds to the criterion of the fourth condition, may be about 300 m. Furthermore, the relative speed between the host vehicle 100 and the other vehicle 102S, which corresponds to the criterion of the fifth condition, may be about 5 km/h.

In step S13, the condition determination unit 48 determines whether the width W1 of the travel lane 112 where the host vehicle 100 travels is more than the first threshold Wth1. The process in step S13 and its meaning are described together with reference to FIG. 4. If the other vehicle 102A, which has stopped at the road shoulder 114, suddenly starts to travel and enters the travel lane 112 just before the host vehicle 100 overtakes the other vehicle 102A, it is difficult for the host vehicle 100 to avoid the other vehicle 102A in the vehicle width direction. Therefore, it is preferable that the host vehicle 100 predicts the travel start of the other vehicle 102A and avoids the other vehicle 102A in advance. For this reason, the condition determination unit 48 determines whether the first condition is satisfied, that is, whether the width W1 of the travel lane 112 where the host vehicle 100 travels is less than the first threshold Wth1.

The width W1 of the travel lane 112 can be determined in a manner that a right lane mark 116R and a left lane mark 116L are recognized on the basis of image information photographed by the cameras 30. Alternatively, the determination is possible by using the map information 76. The image information includes information about the travel lane 112, information about other vehicles 102A, 102F, and information about a road sign 126 (see FIG. 5, FIG. 6) in addition to the information about the lane marks 116R, 116L.

Figure 3:
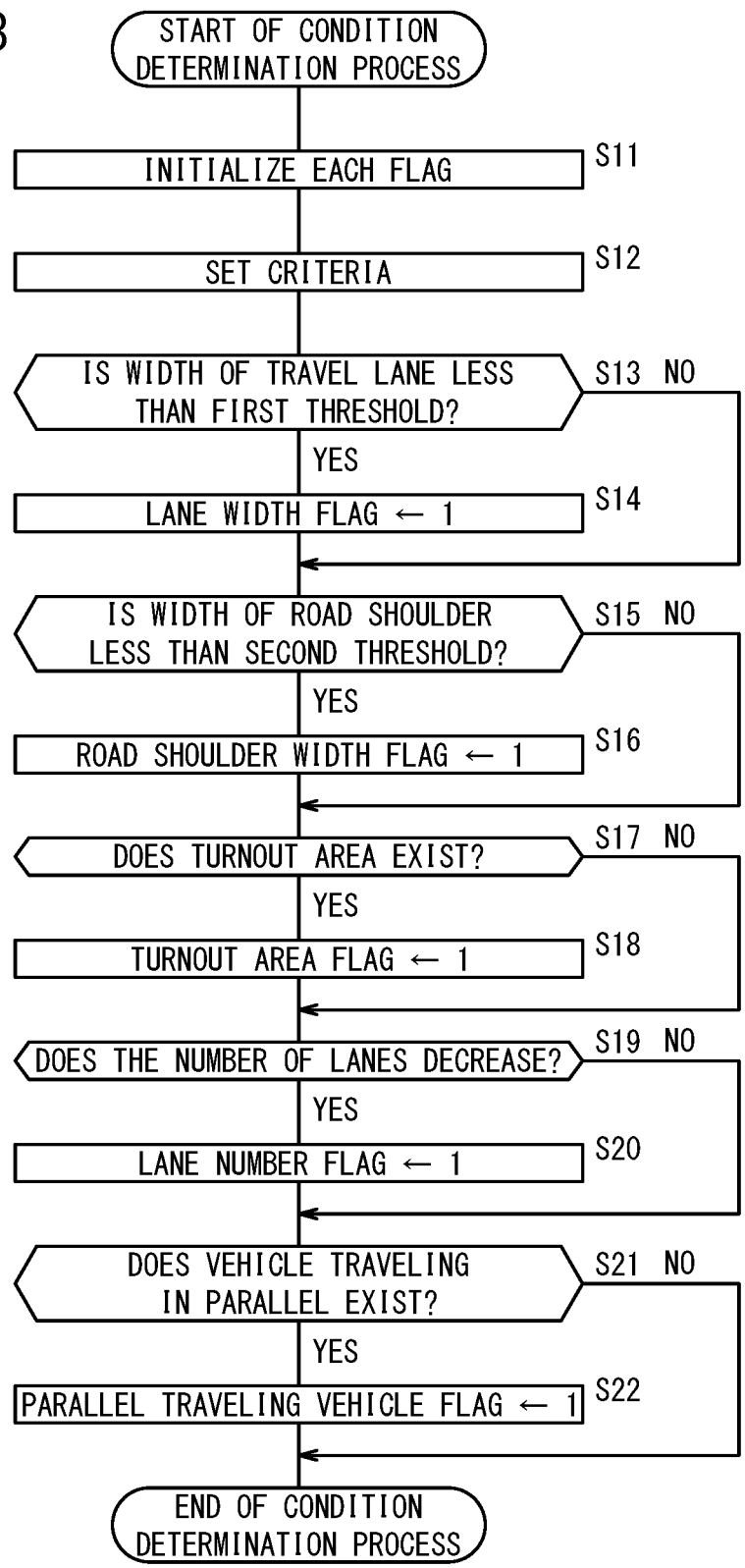
FIG. 3 is a flowchart of a condition determination process.

Back to FIG. 3, the description is continued. If the width W1 of the travel lane 112 is less than the first threshold Wth1 in step S13 (step S13: YES), the process advances to step S14. In step S14, the condition determination unit 48 sets 1 in the lane width flag. On the other hand, if the width W1 of the travel lane 112 is not less than the first threshold Wth1 (step S13: NO), the process advances to step S15.

In step S15, the condition determination unit 48 determines whether the width W2 of the road shoulder 114 is more than the second threshold Wth2. The process in step S15 and its meaning are described together with reference to FIG. 4. If the road shoulder 114 is narrow, the other vehicle 102A that has stopped at the road shoulder 114 may suddenly come in front of the host vehicle 100. Therefore, it is preferable that the host vehicle 100 predicts the coming of the other vehicle 102A and avoids the other vehicle 102A in advance. For this reason, the condition determination unit 48 determines whether the second condition is satisfied, that is, whether the width W2 of the road shoulder 114 of the road 110 where the host vehicle 100 travels is less than the second threshold.

The width W2 of the road shoulder 114 can be determined in a manner that the lane mark 116L, a curbstone 118, and the like are recognized on the basis of the image information photographed by the cameras 30 and/or a detection result from the radars 32 and the LIDARs 34. Alternatively, the determination is possible by using the map information 76 or the like.

Back to FIG. 3, the description is continued. If the width W2 of the road shoulder 114 is less than the second threshold Wth2 in step S15, (step S15: YES), the process advances to step S16. In step S16, the condition determination unit 48 sets 1 in the road shoulder width flag. On the other hand, if the width W2 of the road shoulder 114 is not less than the second threshold Wth2 (step S15: NO), the process advances to step S17.

In step S17, the condition determination unit 48 determines whether the road 110 includes the turnout area 124 within a predetermined distance ahead of the host vehicle 100. The process in step S17 and its meaning are described together with reference to FIG. 5.

If a noise-blocking wall 122 or the like is provided to the road 110, the host vehicle 100 traveling in the travel lane 112 may fail to recognize the other vehicle 102A that has stopped in the turnout area 124. In such a situation, the other vehicle 102A that has stopped in the turnout area 124 may suddenly come in front of the host vehicle 100. Therefore, it is preferable that the host vehicle 100 predicts the travel start of the other vehicle 102A and avoids the other vehicle 102A in advance. For this reason, the condition determination unit 48 determines whether the third condition is satisfied, that is, whether the road 110 includes the turnout area 124 ahead of the host vehicle 100.

Whether the turnout area 124 exists within the predetermined distance ahead of the host vehicle 100 can be determined on the basis of whether the turnout area 124 is recognized or the road sign 126 expressing the existence of the turnout area 124 is recognized from the image information photographed by the cameras 30. Alternatively, the determination is possible by using the map information 76.

Back to FIG. 3, the description is continued. If the turnout area 124 exists in step S17 (step S17: YES), the process advances to step S18. In step S18, the condition determination unit 48 sets 1 in the turnout area flag. On the other hand, if the turnout area 124 does not exist (step S17: NO), the process advances to step S19.

In step S19, the condition determination unit 48 determines whether the number of lanes in the road 110 decreases within a predetermined distance ahead of the host vehicle 100. The process in step S19 and its meaning are described together with reference to FIG. 6.

If the number of lanes in the road 110 decreases at a merge point 128, the other vehicle 102A that travels in a merge lane 130 enters the adjacent travel lane 112 before the merge point 128. In such a situation, the other vehicle 102A may suddenly come in front of the host vehicle 100 traveling in the travel lane 112. Therefore, it is preferable that the host vehicle 100, which travels in the travel lane 112 adjacent to the merge lane 130, predicts the sudden coming of the other vehicle 102A and avoids the other vehicle 102A in advance. For this reason, the condition determination unit 48 determines whether the fourth condition is satisfied, that is, whether the number of lanes in the road 110 decreases ahead of the host vehicle 100.

Whether the merge point 128 is within the predetermined distance ahead of the host vehicle 100 can be determined depending on whether the merge point 128 is recognized or the road sign 126 expressing the existence of the merge point 128 is recognized on the basis of the image information photographed by the cameras 30. Alternatively, the determination is possible by using the map information 76.

Back to FIG. 3, the description is continued. If the number of lanes decreases in step S19 (step S19: YES), the process advances to step S20. In step S20, the condition determination unit 48 sets 1 in the lane number flag. On the other hand, if the number of lanes does not decrease (step S19: NO), the process advances to step S21.

In step S21, the condition determination unit 48 determines whether the other vehicle 102S that travels beside the host vehicle 100 exists. The process in step S21 and its meaning are described together with reference to FIG. 6.

If the host vehicle 100 has recognized the other vehicle 102A that enters the travel lane 112 from the merge lane 130, the host vehicle 100 may change the lane to an adjacent lane 120 in the direction opposite to the merge lane 130 in order to avoid the other vehicle 102A. Here, if the other vehicle 102S that travels beside the host vehicle 100 exists in the adjacent lane 120, the host vehicle 100 cannot change the lane. Therefore, it is preferable that the host vehicle 100 avoids the other vehicle 102S in advance. For this reason, the condition determination unit 48 determines whether the fifth condition is satisfied, that is, whether the other vehicle 102S exists such that the other vehicle 102S travels beside the host vehicle 100 at the position with less than the predetermined distance from the host vehicle 100 and at less than the predetermined relative speed with respect to the host vehicle 100. The distance and the relative speed with respect to the other vehicle 102S that travels beside the host vehicle 100 can be determined on the basis of the detection result from the radars 32 or the LIDARs 34. The determination is also possible by using vehicle-vehicle communication.

Back to FIG. 3, the description is continued. If the other vehicle 102S that travels beside (travels in parallel with) the host vehicle 100 exists in step S21 (step S21: YES), the process advances to step S22. In step S22, the condition determination unit 48 sets 1 in the parallel traveling vehicle flag. If, on the other hand, the other vehicle 102S that travels beside (travels in parallel with) the host vehicle 100 does not exist (step S21: NO), the condition determination process is terminated.

[2.3 Control Changing Process]

The control changing process to be performed in step S5 in FIG. 2 is described with reference to FIG. 7. The process to be described below is performed mainly by the control unit 50. In step S31, the action plan unit 66 determines whether 1 is set in the road shoulder width flag. If set (step S31: YES), the process advances to step S32. If not set (step S31: NO), the process advances to step S33.

If the process has advanced from step S31 to step S32, the action plan unit 66 determines whether 1 is set in the lane width flag. If set (step S32: YES), the process advances to step S34. If not set (step S32: NO), the process advances to step S35.

If the process has advanced from step S31 to step S33, that is, if the second condition is not satisfied (W2≥Wth2), the control unit 50 performs at least one of "vehicle speed control", "inter-vehicle distance control", "lane changing control", "warning control", and "manual driving request control". In this case, which control to perform may be decided on the basis of the external environment information or particular control may be performed in accordance with the satisfied condition (first, third to fifth conditions). For example, if the fifth condition is satisfied, the control other than the lane changing control is performed.

If the process has advanced from step S32 to step S34, that is, if the second condition is satisfied and the first condition is satisfied (W2<Wth2 and W1<Wth1), the control unit 50 performs one of a pair of "vehicle speed control" and "inter-vehicle distance control", "lane changing control", "warning control", and "manual driving request control". Here, which control to perform may be decided on the basis of the external environment information or the particular control may be performed in accordance with the satisfied condition (first to fifth conditions) in a manner similar to step S33. For example, if the fifth condition is satisfied, the control other than the lane changing control is performed.

If the process has advanced from step S32 to step S35, that is, if the second condition is satisfied and the first condition is not satisfied (W2<Wth2 and W1≥Wth1), the control unit 50 performs "vehicle speed control", "inter-vehicle distance control", and "travel position control".

In step S36, the notification control unit 72 outputs the notification instruction to the notification device 28 in order to notify the driver of the reason why the vehicle control (vehicle speed control, inter-vehicle distance control, travel position control, lane changing control) has been performed in step S33 to step S35.

[2.4 Content of Various Kinds of Control]

The control unit 50 performs the vehicle speed control, that is, the control unit 50 controls the vehicle speed V of the host vehicle 100. For example, the vehicle control is performed so that the vehicle speed V becomes a set vehicle speed Vt stored in the storage device 54. Here, the action plan unit 66 creates the action plan for the deceleration control on the basis of the determination result from the condition determination unit 48. The trajectory generation unit 68 generates the scheduled travel trajectory that follows the action plan. The vehicle control unit 70 decides the vehicle control value on the basis of the scheduled travel trajectory, and outputs the control instruction based on the vehicle control value to the driving force device 22, the steering device 24, and the braking device 26.

The control unit 50 performs the inter-vehicle distance control, that is, the control unit 50 controls the inter-vehicle distance between the host vehicle 100 and the other vehicle 102F that travels ahead of the host vehicle 100. For example, the vehicle control is performed so that the inter-vehicle distance between the host vehicle 100 and the other vehicle 102F, which is detected by the radars 32, becomes a predetermined inter-vehicle distance or more in accordance with the vehicle speed V. Here, the action plan unit 66 creates the action plan for the inter-vehicle distance control on the basis of the determination result from the condition determination unit 48. The trajectory generation unit 68 generates the scheduled travel trajectory that follows the action plan. The vehicle control unit 70 decides the vehicle control value on the basis of the scheduled travel trajectory, and outputs the control instruction based on the vehicle control value to the driving force device 22, the steering device 24, and the braking device 26.

Figure 5:
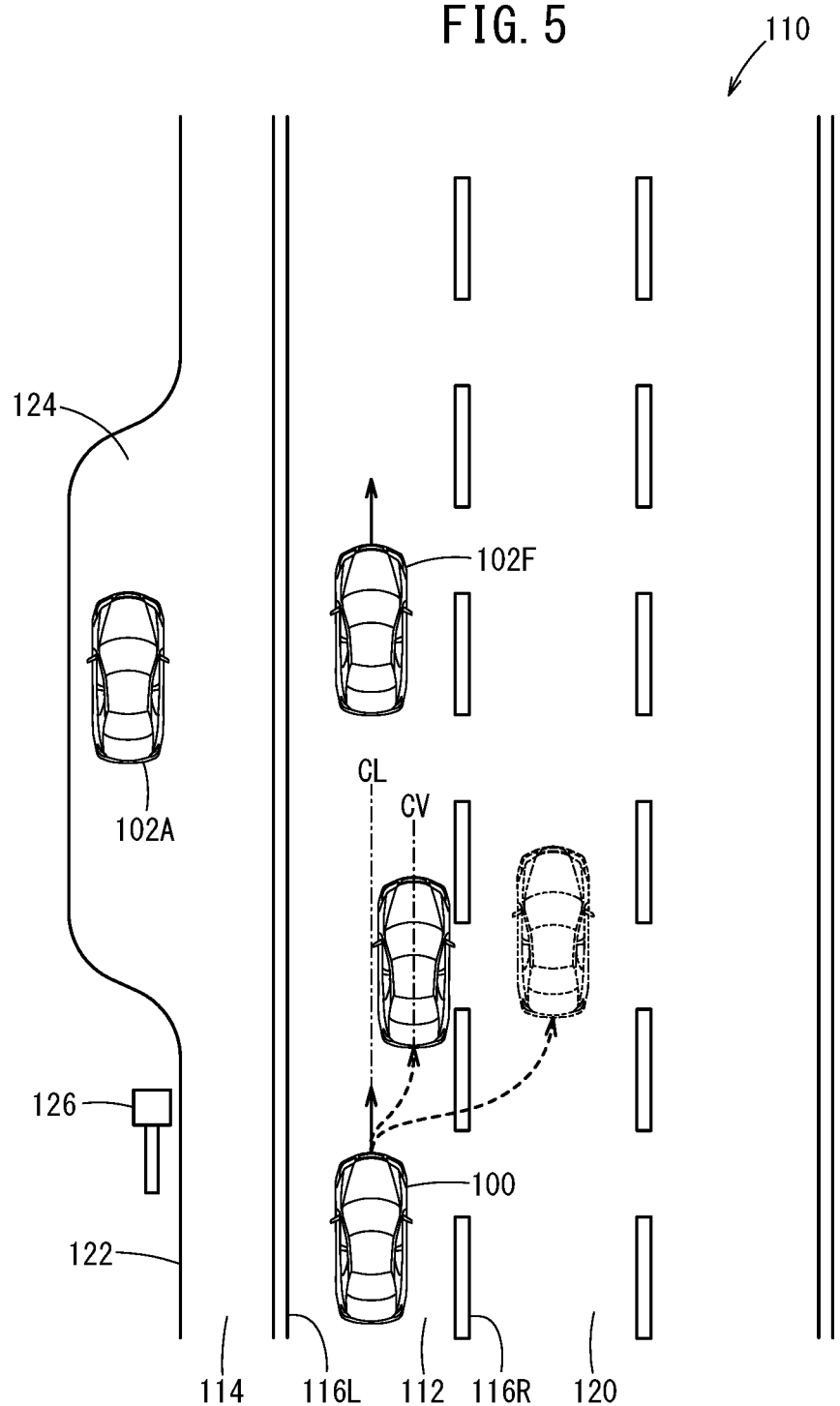
FIG. 5 is a diagram for describing a circumstance where a process in step S17 and step S18 in FIG. 3 is performed.
Figure 6:
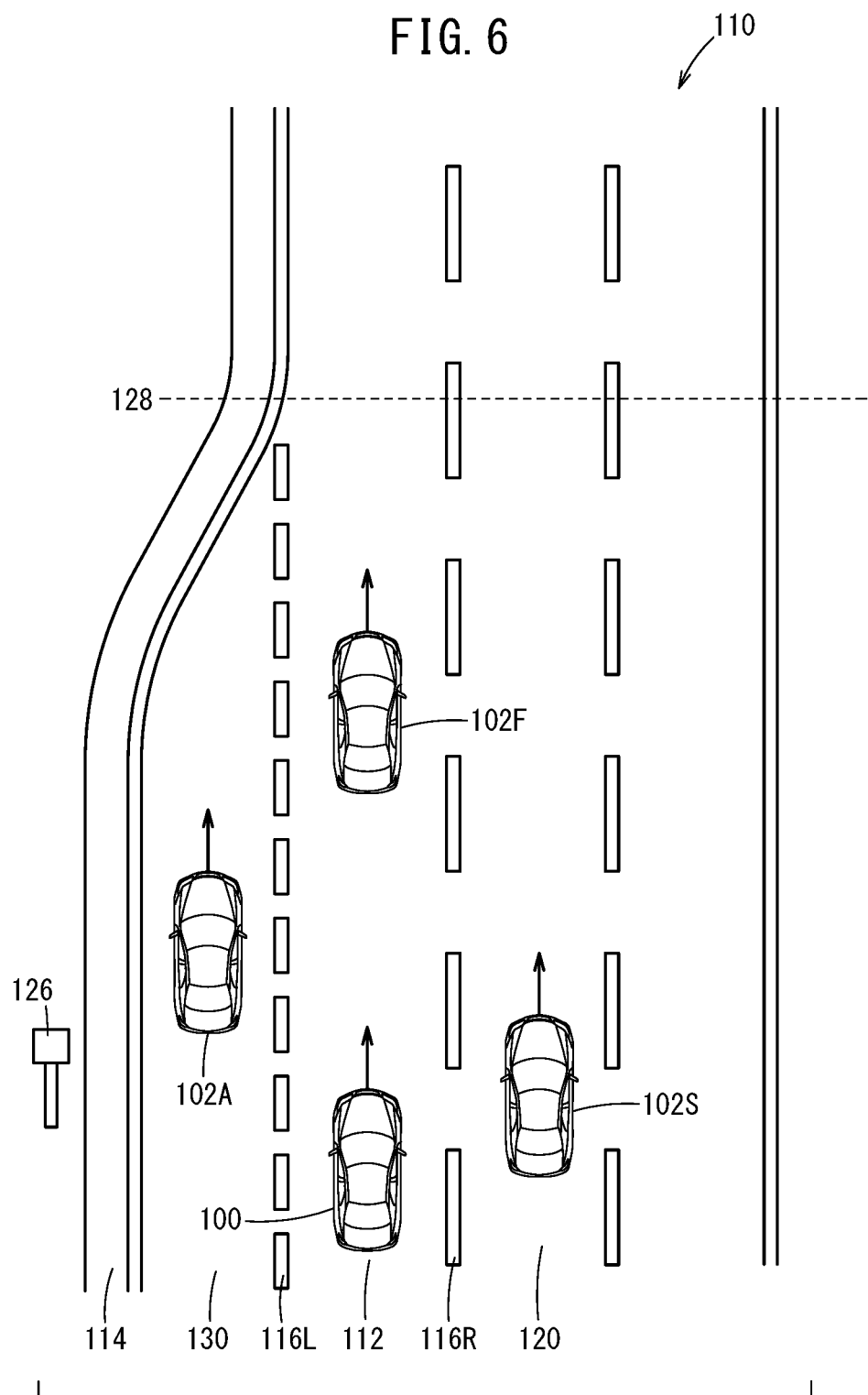
FIG. 6 is a diagram for describing a circumstance where a process in step S19 to step S22 in FIG. 3 is performed.

The control unit 50 performs the travel position control, that is, the control unit 50 causes the host vehicle 100 to move to the side opposite to the road shoulder 114 side so that a center CV of the host vehicle 100 deviates from a center CL of the travel lane 112 (see FIG. 5). For example, the center CL is calculated on the basis of the lane marks 116R, 116L photographed by the cameras 30, and the vehicle control is performed so that the center CV of the host vehicle 100 coincides with the position deviated by a predetermined distance from the center CL to the side opposite to the road shoulder 114 side. The center CV of the host vehicle 100 is set to the position such that the host vehicle 100 does not go over the lane mark 116R. Here, the action plan unit 66 creates the action plan for the travel position control on the basis of the determination result from the condition determination unit 48. The trajectory generation unit 68 generates the scheduled travel trajectory that follows the action plan. The vehicle control unit 70 decides the vehicle control value on the basis of the scheduled travel trajectory, and outputs the control instruction based on the vehicle control value to the driving force device 22, the steering device 24, and the braking device 26.

Figure 4:
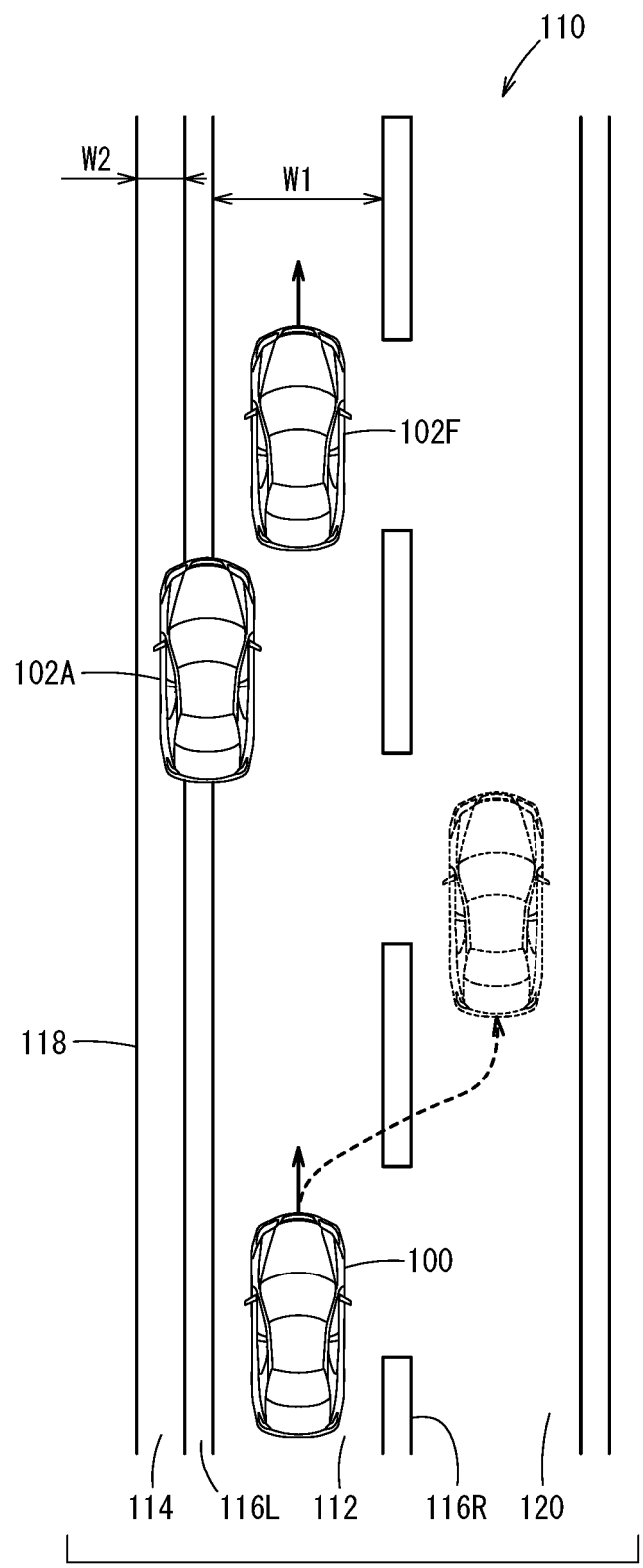
FIG. 4 is a diagram for describing a circumstance where a process in step S13 to step S16 in FIG. 3 is performed.

The control unit 50 performs the lane changing control, that is, the control unit 50 causes the host vehicle 100 to change the lane to the side opposite to the road shoulder 114 side (see FIG. 4, FIG. 5). For example, the vehicle control is performed on the basis of the adjacent lane 120 photographed by the cameras 30. Here, the action plan unit 66 creates the action plan for the lane changing control on the basis of the determination result from the condition determination unit 48. The trajectory generation unit 68 generates the scheduled travel trajectory that follows the action plan. The vehicle control unit 70 decides the vehicle control value on the basis of the scheduled travel trajectory, and outputs the control instruction based on the vehicle control value to the driving force device 22, the steering device 24, and the braking device 26.

The control unit 50 performs the warning control, that is, the control unit 50 warns the vehicle occupant. Here, the action plan unit 66 determines whether to warn the vehicle occupant on the basis of a flag setting result from the condition determination unit 48. The notification control unit 72 having received the determination from the action plan unit 66 outputs the notification instruction for warning to the notification device 28.

The control unit 50 performs the manual driving request control, that is, the control unit 50 prompts the vehicle occupant to drive manually. The manual driving request control is referred to as a T/O (Take Over) request. Here, the action plan unit 66 determines whether to perform the T/O request on the basis of the flag setting result from the external environment recognition unit 46. The notification control unit 72 having received the determination from the action plan unit 66 outputs the notification instruction for warning to the notification device 28.

3. SUMMARY OF EMBODIMENT

The vehicle control device 20 includes: the external environment recognition unit 46 configured to recognize the road environment and the traffic participant around the host vehicle 100; the control unit 50 configured to control the travel and/or control the notification regarding the automated driving of the host vehicle 100; and the condition determination unit 48 configured to determine whether the predetermined condition is satisfied on the basis of the recognition result from the external environment recognition unit 46. The predetermined condition includes at least one of the following: the width W1 of the travel lane 112 where the host vehicle 100 travels is less than the first threshold Wth1 (first condition), the width W2 of the road shoulder 114 of the road 110 where the host vehicle 100 travels is less than the second threshold Wth2 (second condition), the road 110 includes the turnout area 124 ahead of the host vehicle 100 (third condition), the number of lanes in the road 110 decreases ahead of the host vehicle 100 (fourth condition), and the other vehicle 102S exists in a manner that the other vehicle 102S travels beside the host vehicle 100 at the position with less than the predetermined distance from the host vehicle 100 and at less than the predetermined relative speed with respect to the host vehicle 100 (fifth condition). If the host vehicle 100 travels in the travel lane 112 adjacent to the area outside the travel path (the road shoulder 114, the median strip, or the like), the control unit 50 is configured to change the content of the control depending on whether the first to fifth conditions are satisfied (step S5, step S6 in FIG. 2).

By the above configuration, if the host vehicle 100 travels in the travel lane 112 adjacent to the area outside the travel path and the first to fifth conditions are satisfied, the host vehicle 100 can avoid the other vehicle 102A, which stops outside the travel path or travels in the merge lane 130, in advance in preparation for the coming of the other vehicle 102A in front of the host vehicle 100. Therefore, the host vehicle 100 does not generate the large braking force or steering quantity when the other vehicle 102A comes, and accordingly, the riding comfort of the vehicle occupant does not deteriorate.

The control to be performed by the control unit 50 includes at least one of: the vehicle speed control for controlling the vehicle speed V of the host vehicle 100; the inter-vehicle distance control for controlling the inter-vehicle distance between the host vehicle 100 and the other vehicle 102F (preceding vehicle); the travel position control for deviating the center CV of the host vehicle 100 from the center CL of the travel lane 112 by causing the host vehicle 100 to move to the side opposite to the side of the road shoulder 114; the lane changing control for causing the host vehicle 100 to change the lane to the side opposite to the side of the road shoulder 114; the warning control for warning the vehicle occupant; and the manual driving request control for prompting the vehicle occupant to drive manually. By the above configuration, the control to avoid the other vehicle 102A is performed in advance; therefore, the riding comfort of the vehicle occupant does not deteriorate.

The condition determination unit 48 may set the criteria of the first to fifth conditions in accordance with at least one of the type of the traffic participant, the quantity of the traffic participant, and the vehicle speed V of the host vehicle 100 (step S12 in FIG. 3). By the above configuration, whether the first to fifth conditions are satisfied can be determined with higher accuracy.

Figure 7:
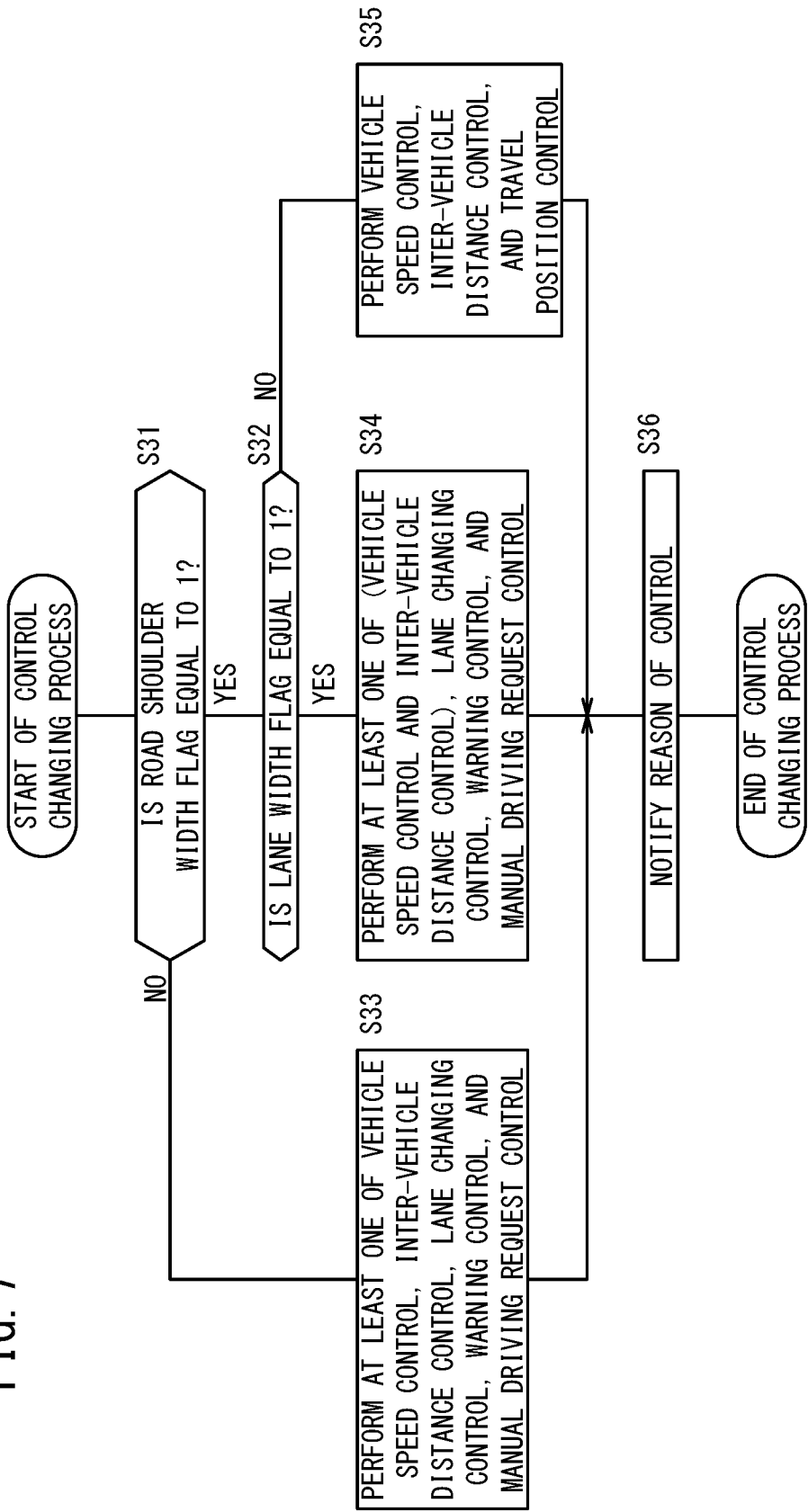
FIG. 7 is a flowchart of a control changing process.

If at least one of the vehicle speed control, the inter-vehicle distance control, the travel position control, and the lane changing control is performed, the control unit 50 is configured to perform the notification control to notify the vehicle occupant of the reason why the control is performed (step S36 in FIG. 7). By the above configuration, the vehicle occupant does not feel uncomfortable in the operation of the host vehicle 100.

The vehicle control device according to the present invention is not limited to the embodiment described above, and can employ various configurations without departing from the concept of the present invention.

The invention claimed is:

1. A vehicle control device provided for a host vehicle that can travel by automated driving, comprising one or more processors that execute computer-executable instructions stored in a memory, wherein the one or more processors execute the computer-executable instructions to cause the vehicle control device to:
   recognize a road environment and a traffic participant around the host vehicle;
   control travel and/or control notification regarding the automated driving of the host vehicle; and
   determine whether a predetermined condition is satisfied on a basis of a recognition result from an external environment recognition unit,
   wherein the predetermined condition includes:
      a width of a lane where the host vehicle travels is less than a first threshold; and
      a width of a road shoulder of a road where the host vehicle travels is less than a second threshold, and
   wherein if the host vehicle travels in a lane adjacent to an area outside a travel path, the one or more processors cause the vehicle control device to change a content of the control depending on whether the predetermined condition is satisfied,
   if the width of the road shoulder of the road where the host vehicle travels is less than the second threshold and the width of the lane where the host vehicle travels is less than the first threshold, the one or more processors cause the vehicle control device to perform vehicle speed control and inter-vehicle distance control, and
   if the width of the road shoulder of the road where the host vehicle travels is less than the second threshold and the width of the lane where the host vehicle travels is not less than the first threshold, the one or more processors cause the vehicle control device to perform travel position control for deviating from a center of the lane where the host vehicle travels by causing the host vehicle to move to a side opposite to a side of the road shoulder.

2. The vehicle control device according to claim 1, wherein the control further includes:
   a lane changing control for causing the host vehicle to change a lane to the side opposite to the side of the road shoulder;
   warning control for warning a vehicle occupant; and
   manual driving request control for prompting the vehicle occupant to drive manually.

3. The vehicle control device according to claim 1, wherein the one or more processors cause the vehicle control device to set a criterion of the predetermined condition in accordance with at least one of a type of the traffic participant, a quantity of the traffic participant, and vehicle speed of the host vehicle.

4. The vehicle control device according to claim 2, wherein if at least one of a vehicle speed control, a inter-vehicle distance control, a travel position control, and the lane changing control is performed, the one or more processors cause the vehicle control device to perform notification control to notify the vehicle occupant of a reason why the control is performed.

\* \* \* \* \*